United States Patent
Ryu et al.

(10) Patent No.: US 11,673,985 B2
(45) Date of Patent: Jun. 13, 2023

(54) CROSSLINKED POLYOLEFIN SEPARATOR AND METHOD FOR MANUFACTURING THE SAME

(71) Applicant: LG Chem, Ltd., Seoul (KR)

(72) Inventors: Bi-Oh Ryu, Daejeon (KR); Won-Sik Bae, Daejeon (KR); Joo-Sung Lee, Daejeon (KR); A-Young Lee, Daejeon (KR)

(73) Assignee: LG Chem, Ltd.

( * ) Notice: Subject to any disclaimer, the term of this patent is extended or adjusted under 35 U.S.C. 154(b) by 409 days.

(21) Appl. No.: 16/766,116

(22) PCT Filed: Sep. 3, 2019

(86) PCT No.: PCT/KR2019/011328
§ 371 (c)(1),
(2) Date: May 21, 2020

(87) PCT Pub. No.: WO2020/050589
PCT Pub. Date: Mar. 12, 2020

(65) Prior Publication Data
US 2020/0365860 A1    Nov. 19, 2020

(30) Foreign Application Priority Data
Sep. 3, 2018  (KR) .................. 10-2018-0104827

(51) Int. Cl.
| | | |
|---|---|---|
| *C08F 255/02* | (2006.01) | |
| *C08J 9/28* | (2006.01) | |
| *H01M 10/0525* | (2010.01) | |
| *H01M 50/403* | (2021.01) | |
| *H01M 50/406* | (2021.01) | |
| *H01M 50/417* | (2021.01) | |
| *H01M 50/489* | (2021.01) | |

(52) U.S. Cl.
CPC ............ *C08F 255/02* (2013.01); *C08J 9/28* (2013.01); *H01M 10/0525* (2013.01); *H01M 50/403* (2021.01); *H01M 50/406* (2021.01); *H01M 50/417* (2021.01); *H01M 50/489* (2021.01); *C08F 2810/20* (2013.01); *C08J 2201/042* (2013.01); *C08J 2351/06* (2013.01)

(58) Field of Classification Search
CPC ....... C08F 255/02; C08F 2810/10; C08J 9/28; C08J 2201/042; C08J 2351/06
See application file for complete search history.

(56) References Cited

U.S. PATENT DOCUMENTS

| | | | |
|---|---|---|---|
| 2009/0226813 A1 | 9/2009 | Takita et al. | |
| 2009/0226814 A1 | 9/2009 | Takita et al. | |
| 2012/0135289 A1 | 5/2012 | Noda | |
| 2015/0056492 A1 | 2/2015 | Huang | |
| 2016/0126518 A1 | 5/2016 | Park et al. | |

FOREIGN PATENT DOCUMENTS

| | | |
|---|---|---|
| CN | 101971390 A | 2/2011 |
| CN | 102134342 A | 7/2011 |
| CN | 105140452 A | 12/2015 |
| CN | 105576172 A | 5/2016 |
| CN | 106920912 A | 7/2017 |
| JP | H11144700 A | 5/1999 |
| JP | H11172036 A | 6/1999 |
| KR | 20120074365 A | 7/2012 |
| KR | 101318062 B1 | 10/2013 |
| KR | 20150069781 A | 6/2015 |
| KR | 20160052332 A | 5/2016 |
| KR | 20160129583 A | 11/2016 |
| KR | 20180033487 A | 4/2018 |

OTHER PUBLICATIONS

International Search Report from Application No. PCT/KR2019/011328 dated Dec. 27, 2019, 2 pages.
Search Report dated Jan. 27, 2022 from Office Action for Chinese Application No. 201980005934.5 dated Feb. 15, 2022. 3 pgs.
Extended European Search Report including Written Opinion for Application No. EP19858288.4, dated Dec. 11, 2020, pp. 1-6.

*Primary Examiner* — Irina S Zemel
*Assistant Examiner* — Jeffrey S Lenihan
(74) *Attorney, Agent, or Firm* — Lerner David LLP

(57) ABSTRACT

A method for manufacturing a crosslinked polyolefin separator and the crosslinked polyolefin separator obtained by the method are provided. The method includes (S1) mixing polyolefin, a diluting agent, an initiator and alkoxysilane containing a carbon-carbon double bonded group to an extruder, and then carrying out extrusion to obtain a silane-grafted polyolefin composition; (S2) molding and orienting the extruded silane-grafted polyolefin composition in the form of a sheet; (S3) introducing the oriented sheet to an extraction water bath containing a crosslinking catalyst to extract the diluting agent and perform aqueous crosslinking; and (S4) thermally fixing a resultant aqueous crosslinked product. The method can provide a separator having a high meltdown temperature and improved heat shrinkage.

17 Claims, No Drawings

CROSSLINKED POLYOLEFIN SEPARATOR AND METHOD FOR MANUFACTURING THE SAME

CROSS-REFERENCE TO RELATED APPLICATION

The present application is a national phase entry under 35 U.S.C. § 371 of International Application No. PCT/KR2019/011328 filed Sep. 3, 2019 which claims priority from Korean Patent Application No. 10-2018-0104827 filed on Sep. 3, 2018 in the Republic of Korea, the disclosures of which are incorporated herein by reference in their entirety.

TECHNICAL FIELD

The present disclosure relates to a crosslinked polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between a shutdown temperature and a meltdown temperature so that a lithium secondary battery including the separator may ensure safety. To broaden the interval between a shutdown temperature and a meltdown temperature, it is required that the shutdown temperature is controlled to be decreased and the meltdown temperature is controlled to be increased.

As a method for increasing the meltdown temperature, there is use of a crosslinked polyolefin porous membrane. However, when the meltdown temperature is increased through crosslinking, there is a problem in that crosslinking attraction force or internal stress is generated significantly at a high temperature (about 100° C. or higher) due to the three-dimensional network structure of the resultant separator, resulting in an increase in heat shrinkage.

DISCLOSURE

Technical Problem

The present disclosure is designed to solve the problems of the related art, and therefore the present disclosure is directed to providing a crosslinked polyolefin separator having a high meltdown temperature and improved heat shrinkage, and a method for manufacturing the same.

Technical Solution

In one aspect of the present disclosure, there is provided a method for manufacturing a crosslinked polyolefin separator according to any one of the following embodiments.

According to the first embodiment of the present disclosure, there is provided a method for manufacturing a crosslinked polyolefin separator, including the steps of:

(S1) introducing polyolefin, a diluting agent, an initiator and alkoxysilane containing a carbon-carbon double bonded group to an extruder, followed by mixing, and then carrying out extrusion to obtain a silane-grafted polyolefin composition;

(S2) molding and orienting the extruded silane-grafted polyolefin composition in the form of a sheet;

(S3) introducing the oriented sheet to an extraction water bath containing a crosslinking catalyst to extract the diluting agent and to perform aqueous crosslinking; and (S4) thermally fixing the resultant aqueous crosslinked product.

According to the second embodiment of the present disclosure, there is provided the method for manufacturing a crosslinked polyolefin separator as defined in the first embodiment, wherein the extraction water bath includes water and an extraction solvent.

According to the third embodiment of the present disclosure, there is provided the method for manufacturing a crosslinked polyolefin separator as defined in the second embodiment, wherein the extraction water bath further includes an alcohol.

According to the fourth embodiment of the present disclosure, there is provided the method for manufacturing a crosslinked polyolefin separator as defined in the third embodiment, wherein the weight ratio of water to alcohol is 95:5-80:20.

According to the fifth embodiment of the present disclosure, there is provided the method for manufacturing a crosslinked polyolefin separator as defined in the third embodiment, wherein the alcohol includes methanol, ethanol, propanol, isopropyl alcohol, butanol, pentanol, hexanol or a mixture of at least two of them.

According to the sixth embodiment of the present disclosure, there is provided the method for manufacturing a crosslinked polyolefin separator as defined in any one of the first to the fifth embodiments, wherein the extraction water bath has a temperature of 40° C. or higher.

According to the seventh embodiment of the present disclosure, there is provided the method for manufacturing a crosslinked polyolefin separator as defined in any one of the first to the sixth embodiments, wherein the content of the alkoxysilane containing a carbon-carbon double bonded group is 0.01-1.0 parts by weight based on 100 parts by weight of the total weight of the polyolefin and the diluting agent, and the content of the initiator is 0.1-5.0 parts by weight based on 100 parts by weight of the alkoxysilane containing a carbon-carbon double bonded group.

According to the eighth embodiment of the present disclosure, there is provided the method for manufacturing a crosslinked polyolefin separator as defined in any one of the first to the seventh embodiments, wherein the thermal fixing is carried out at a temperature of 120-150° C.

According to the ninth embodiment of the present disclosure, there is provided the method for manufacturing a crosslinked polyolefin separator as defined in any one of the first to the eighth embodiments, wherein the alkoxysilane containing a carbon-carbon double bonded group includes vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane or a mixture of at least two of them.

According to the tenth embodiment of the present disclosure, there is provided the method for manufacturing a crosslinked polyolefin separator as defined in the first to the ninth embodiments, wherein the crosslinking catalyst includes dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, hydrochloric acid, toluene sulfonic acid, acetic acid, stearic acid, maleic acid or a mixture of at least two of them.

According to the eleventh embodiment of the present disclosure, there is provided the method for manufacturing a crosslinked polyolefin separator as defined in the first to the tenth embodiments, wherein the content of the crosslinking catalyst is 0.1-10 parts by weight based on 100 parts by weight of the alkoxysilane containing a carbon-carbon double bonded group.

According to the twelfth embodiment of the present disclosure, there is provided the method for manufacturing a crosslinked polyolefin separator as defined in the first to the eleventh embodiments, which further includes a step of disposing an interleaving film coated with aqueous dispersion containing a crosslinking catalyst on the oriented sheet, between step (S2) and step (S3); and a step of extracting the diluting agent and removing the interleaving film, in step (S3). According to the thirteenth embodiment of the present disclosure, there is provided the method for manufacturing a crosslinked polyolefin separator as defined in the first to the twelfth embodiments, which further includes a step of carrying out aqueous crosslinking of the thermally fixed product at a temperature of 70-90° C. under a relative humidity of 70-90%, after step (S4).

In another aspect of the present disclosure, there is also provided a crosslinked polyolefin separator according to any one of the following embodiments.

According to the fourteenth embodiment of the present disclosure, there is provided a crosslinked polyolefin separator which has a heat shrinkage (120° C./1 hr) in the machine direction (MD) and a heat shrinkage (120° C./1 hr) in the transverse direction (TD) satisfying the following Formula 1:

$$MD+TD \leq 10\%$$ [Formula 1]

wherein MD represents the heat shrinkage of the crosslinked polyolefin separator in MD and TD represents the heat shrinkage of the crosslinked polyolefin separator in TD, and the heat shrinkage is calculated by the formula of:

Heat shrinkage=(Initial length−Length after carrying out heat shrinking treatment at 120° C. for 1 hour)/(Initial length)×100

According to the fifteenth embodiment of the present disclosure, there is provided the crosslinked polyolefin separator as defined in the fourteenth embodiment, which is applied to a lithium secondary battery.

Advantageous Effects

In the method for manufacturing a crosslinked polyolefin separator according to the present disclosure, extraction of a diluting agent and aqueous crosslinking are carried out at the same time, and then the resultant aqueous crosslinked product is thermally fixed. As a result, it is possible to provide a crosslinked polyolefin separator having a high meltdown temperature and improved heat shrinkage, and a method for manufacturing the same.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there are provided a method for manufacturing a crosslinked polyolefin separator and a crosslinked polyolefin separator obtained thereby.

A separator used for a lithium secondary battery shows excellent safety, when it has a large difference between the shutdown temperature and meltdown temperature. Herein, in order to broaden the interval between them, it is required that the shutdown temperature is controlled to be decreased and the meltdown temperature is controlled to be increased.

Therefore, the present inventors used a crosslinked polyolefin porous membrane in order to obtain a separator having a higher meltdown temperature. The inventors of the present disclosure have found that the conventional crosslinked polyolefin porous membrane causes a problem of an increase in heat shrinkage, when aqueous crosslinking is carried out after polyolefin subjected to silane grating is thermally fixed. Particularly, strong internal stress works at a high temperature (about 100° C. or higher) due to the three-dimensional network structure formed by aqueous crosslinking. Thus, the effect of thermal fixing carried out before aqueous crosslinking becomes insufficient and heat shrinkage at high temperature is increased significantly. In other words, there is a problem in that the porous membrane undergoes a change in physical properties, since aqueous crosslinking is carried out after thermal fixing, resulting in degradation of the thermal fixing effect and an increase in heat shrinkage.

The inventors of the present disclosure have conducted intensive studies to solve the above-mentioned problems. The present disclosure is directed to providing a crosslinked polyolefin separator having improved heat shrinkage by carrying out extraction of a diluting agent and aqueous crosslinking at the same time, and then thermally fixing the resultant aqueous crosslinked product, and a method for manufacturing the same.

In one aspect of the present disclosure, there is provided a method for manufacturing a crosslinked polyolefin separator, including the steps of:

(S1) introducing polyolefin, a diluting agent, an initiator and alkoxysilane containing a carbon-carbon double bonded group to an extruder, followed by mixing, and then carrying out extrusion to obtain a silane-grafted polyolefin composition;

(S2) molding and orienting the extruded silane-grafted polyolefin composition in the form of a sheet;

(S3) introducing the oriented sheet to an extraction water bath containing a crosslinking catalyst to extract the diluting agent and to perform aqueous crosslinking; and (S4) thermally fixing the resultant aqueous crosslinked product.

In the method according to the related art, a porous membrane prepared by extracting a diluting agent is thermally fixed first, and then is subjected to aqueous crosslinking to obtain a crosslinked polyolefin separator. However, according to the above-mentioned method, the effect of providing thermal history through thermal fixing disappears due to the aqueous crosslinking carried out after the thermal fixing, thereby providing a separator having high heat shrinkage. In other words, since the porous membrane undergoes a change in physical properties while it is subjected to aqueous crosslinking after thermal fixing, the effect of thermal fixing carried out before the aqueous crosslinking is insufficient.

However, according to the present disclosure, extraction of a diluting agent and aqueous crosslinking are carried out at the same time, and then the resultant aqueous crosslinked product is thermally fixed to solve the above-mentioned problem. In this manner, it is possible to provide a crosslinked polyolefin separator having improved heat shrinkage and a method for manufacturing the same.

Hereinafter, the method for manufacturing a crosslinked polyolefin separator according to the present disclosure will be explained in detail.

First, polyolefin, a diluting agent, an initiator and alkoxysilane containing a carbon-carbon double bonded group are introduced to and mixed in an extruder, and then extrusion is carried out to obtain a silane-grafted polyolefin composition (S1).

According to an embodiment of the present disclosure, polyolefin may be polyethylene; polypropylene; polybutylene; polypentene; polyhexene; polyoctene; a copolymer of at least two of ethylene, propylene, butene, pentene, 4-methylpentene, hexane, heptane and octene; or a mixture thereof.

Particularly, the polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the silane-grafted polyolefin may be polyethylene; polypropylene; polybutylene; polypentene; polyhexene; polyoctene; a copolymer of at least two of ethylene, propylene, butene, pentene, 4-methylpentene, hexane, heptane and octene; or a mixture thereof.

Particularly, the polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the polyolefin may have a weight average molecular weight of 200,000-1,000,000, 220,000-700,000, or 250,000-500,000. According to the present disclosure, it is possible to obtain a separator having excellent strength and heat resistance, while ensuring separator film uniformity and film-forming processability, by using high-molecular weight polyolefin having a weight average molecular weight of 200,000-1,000,000 as a starting material.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linoleic acid, or the like, C10-C20 fatty acid alcohol, such as palmitic acid alcohol, stearic acid alcohol, oleic acid alcohol, or the like; saturated or unsaturated fatty acid whose fatty acid group has 4-26 carbon atoms, such as palmitic acid mono-, di- or tri-ester, stearic acid mono-, di- or tri-ester, oleic acid mono-, di- or tri-ester, linoleic acid mono-, di- or tri-ester, or the like; or a fatty acid ester in which one or at least two fatty acids having an epoxy-substituted double bond of unsaturated fatty acid are ester-bound with a C1-C10 alcohol having 1-8 hydroxyl groups.

The diluting agent may include any one of the above-described ingredients or a mixture of at least two of them.

According to an embodiment of the present disclosure, the content of the diluting agent may be 100-350 parts by weight, 125-300 parts by weight, or 150-250 parts by weight, based on 100 parts by weight of polyolefin. When the total content of the diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as breakage upon orientation and non-uniform thickness, caused by a decrease in compatibility of polyolefin with a diluting agent and extrusion of polyolefin in the form of gel without thermodynamic blending of polyolefin with a diluting agent.

According to an embodiment of the present disclosure, the alkoxysilane containing a carbon-carbon double bonded group is a crosslinking agent inducing silane crosslinking, is grafted to polyolefin through vinyl groups, and functions to perform crosslinking of polyolefin through aqueous crosslinking caused by alkoxy groups.

According to an embodiment of the present disclosure, the alkoxysilane containing a carbon-carbon double bonded group may include a compound represented by the following Chemical Formula 1:

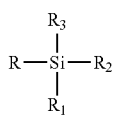

[Chemical Formula 1]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryloxy group, methacryloxy group, or methacryl group.

Meanwhile, R may further include an amino group, epoxy group or an isocyanate group.

According to an embodiment of the present disclosure, the alkoxysilane containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy) silane, vinylmethyldiethoxysilane or a mixture of at least two of them.

According to an embodiment of the present disclosure, the content of the alkoxysilane containing a carbon-carbon double bonded group may be 0.01-1 parts by weight, or 0.05-0.7 parts by weight, based on 100 parts by weight of the total weight of the polyolefin and the diluting agent. When the content of the alkoxysilane containing a carbon-carbon double bonded group satisfies the above-defined range, it is possible to prevent the problems of a decrease in crosslinking degree caused by the reduced graft ratio resulting from a low silane content, and degradation of the appearance of an extruded sheet caused by the residue of unreacted silane resulting from a high silane content.

According to an embodiment of the present disclosure, the initiator may be any initiator, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of the initiator may be 0.1-5 parts by weight, 0.5-4 parts by weight, or 1-2 parts by weight, based on 100 parts by weight of the alkoxysilane containing the carbon-carbon double bonded group. When the content of the initiator satisfies the above-defined range, it is possible to prevent the problems of a decrease in silane graft ratio caused by a low content of initiator, and crosslinking between polyethylene molecules in an extruder caused by a high content of initiator.

According to an embodiment of the present disclosure, if necessary, the silane-grafted polyolefin composition may further include conventional additives for improving specific functions, such as an antioxidant, UV stabilizer, antistatic agent, nucleating agent, or the like.

Next, the reactive extruded silane-grafted polyolefin composition is molded in the form of a sheet and oriented (S2).

For example, the reactive extruded silane-grafted polyolefin composition is extruded by using an extruder equipped with a T-die, or the like, and then cooled extrudate may be formed by using a general casting or calendaring process using water-cooling or air-cooling mode.

According to an embodiment of the present disclosure, it is possible to provide a separator having improved mechanical strength and puncture strength through the orientation step as mentioned above.

According to an embodiment of the present disclosure, the orientation may be carried out by sequential or simultaneous orientation using a roll or tenter. The orientation ratio may be 3 times or more, or 4-10 times, each in the machine direction and transverse direction. When the orientation ratio satisfies the above-defined ratio, it is possible to prevent the problem of insufficient orientation in one direction, a failure in balance of physical properties between the machine direction and the transverse direction, and degradation of tensile strength and puncture strength. When the total orientation ratio satisfies the above-defined range, it is possible to prevent the problems of non-orientation or a failure in pore formation.

According to an embodiment of the present disclosure, the orientation temperature may be varied with the melting point of polyolefin and concentration and type of the diluting agent.

According to an embodiment of the present disclosure, when the polyolefin is polyethylene and the diluting agent is liquid paraffin, the orientation temperature may be 70-160° C., 90-140° C., or 100-130° C. in the machine direction (MD), and may be 90-180° C., 110-160° C., or 120-150° C. in the transverse direction (TD).

When the orientation temperature satisfies the above-defined range, it is possible to prevent the problem of breakage or non-orientation caused by the lack of softness resulting from a low orientation temperature. In addition, it is possible to prevent over-orientation or a difference in physical properties, caused by a high orientation temperature.

Then, the oriented sheet is introduced to an extraction water bath containing a cros slinking catalyst to extract the diluting agent and to perform aqueous cros slinking (S3).

According to the present disclosure, thermal fixing is carried out after aqueous crosslinking is carried out first in order to prevent the porous membrane from undergoing a change in physical properties when aqueous crosslinking is carried out after thermal fixing. Herein, when thermal fixing is carried out after aqueous crosslinking is accomplished to the highest degree, the porous membrane is subjected to thermal history while its physical properties of are not changed. Thus, it is possible to improve heat shrinkage.

According to an embodiment of the present disclosure, the extraction water bath includes water and an extraction solvent. According to the present disclosure, the crosslinking catalyst may be dissolved in the extraction solvent in the extraction water bath. According to the present disclosure, the crosslinking catalyst may be dissolved in water in the extraction water bath. In the extraction water bath according to an embodiment of the present disclosure, —Si—O—CH$_3$ in the silane-grafted polyolefin composition is hydrolyzed with water so that it may be substituted with —Si—OH.

According to an embodiment of the present disclosure, the extraction water bath may be divided into two layers. Particularly, an extraction solvent having a higher specific gravity may be positioned at the lower layer and water may be positioned at the upper layer. Since water is positioned at the upper layer as compared to the extraction solvent, it is possible to prevent evaporation of the extraction solvent.

According to the present disclosure, the diluting agent is extracted in the extraction water bath containing a crosslinking catalyst to provide a porous membrane, while aqueous crosslinking occurs at the same time. Particularly, the diluting agent present in the silane-grafted polyolefin composition is removed from the extraction solvent layer in the extraction water bath, while the removed site of the diluting agent is substituted with the crosslinking catalyst. Then, the silane-grafted composition containing the crosslinking catalyst reacts with water present at the upper layer in the extraction water bath to cause aqueous crosslinking.

According to an embodiment of the present disclosure, the crosslinking catalyst may be present in an amount of 0.1-10 parts by weight, or 0.5-2 parts by weight, based on 100 parts by weight of the alkoxysilane containing a carbon-carbon double bonded group.

According to an embodiment of the present disclosure, the extraction water bath may further include an alcohol. The alcohol does not directly react with Si—O—CH$_3$ but can dissolve the crosslinking catalyst.

According to an embodiment of the present disclosure, the weight ratio of water to alcohol may be 95:5-80:20, or 90:10-85:15. Within the above-defined range, the crosslinking catalyst may be dissolved better and evaporation of the extraction solvent may be prevented.

According to an embodiment of the present disclosure, the alcohol may include methanol, ethanol, propanol, isopropyl alcohol, butanol, pentanol, hexanol or a mixture of at least two of them.

The extraction water bath may have a temperature of 40° C. or higher, 45° C. or higher, or 50° C. or higher. Even when the crosslinking catalyst is present alone in the extraction water bath, aqueous crosslinking may be carried out. However, when the extraction water bath is controlled to a temperature of 40° C. or higher as mentioned above, water molecules show a higher reaction rate so that aqueous crosslinking may occur more rapidly.

According to an embodiment of the present disclosure, the crosslinking catalyst is added to accelerate silane crosslinking.

According to an embodiment of the present disclosure, the crosslinking catalyst may be a carboxylate of metal, such as tin, zinc, iron, zinc or cobalt, organic base, inorganic acid or an organic acid. Non-limiting examples of the crosslinking catalyst include metal carboxylates, such as dibutyltin dilaurate, dibutyltin diacetate, stannous acetate, stannous caprylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as toluene sulfonic acid, acetic acid, stearic acid and maleic acid. Such crosslinking catalyst may be used alone or in combination.

According to an embodiment of the present disclosure, the content of the crosslinking catalyst may be 0.1-10 parts by weight, 0.5-5 parts by weight, or 1-2 parts by weight, based on 100 parts by weight of the alkoxysilane containing a carbon-carbon double bonded group. When the content of the crosslinking catalyst satisfies the above-defined range, it is possible to carry out silane crosslinking to a desired level and to prevent undesired side reactions in a lithium secondary battery. In addition, there is no cost-related problem, such as waste of the catalyst.

According to an embodiment of the present disclosure, the diluting agent may be extracted from the porous membrane by using an extraction solvent, and then the porous membrane may be dried.

According to an embodiment of the present disclosure, the extraction solvent may be an organic solvent.

For example, the extraction solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction process may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agent is larger than 1 wt %, physical properties are degraded and permeability of the porous membrane is reduced. The content of residual diluting agent may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agent, extraction efficiency may be decreased significantly. Thus, the extraction temperature should be higher than the solidifying point of the diluting agents.

In addition, the extraction time may be varied with the thickness of a porous membrane. In the case of a separator having a thickness of 5-15 μm, the extraction time may be 2-4 minutes suitably.

As described hereinabove, aqueous crosslinking may be carried out simultaneously with the extraction of the diluting agent. Herein, the porous membrane may be subjected to aqueous crosslinking to a degree of 10% or more, after the extraction. According to the present disclosure, since the extraction of the diluting agent and aqueous crosslinking are carried out at the same time, no additional aqueous crosslinking process is required. Therefore, it is possible to improve cost-efficiency and time-efficiency. In addition, when carrying out aqueous crosslinking after thermal fixing, wrinkling occurs in the width direction of a separator due to the mutual attraction. However, when aqueous crosslinking is carried out simultaneously with extraction of a diluting agent according to the present disclosure, shrinkage in the width direction is not significantly high, and thus no wrinkling occurs and a separator having a smooth surface can be obtained.

Then, the resultant aqueous crosslinked product is thermally fixed (S4).

The thermal fixing is a process of fixing and heating the porous membrane so that the porous membrane to be shrunk may be fixed forcibly to remove residual stress.

According to the present disclosure, thermal fixing is carried out in order to prevent inertia by which the silane-grafted polyolefin composition returns to its original state after its molding and orientation. In the thermal fixing step, the oriented sheet is heated to remove the stress. Thus, the oriented sheet is molten to a desired degree and the stress is removed.

However, when aqueous crosslinking is carried out after thermal fixing according to the related art, stress exists due to the crosslinking of molecules in polymer fibrils during such crosslinking carried out after thermal fixing at a currently used thermal fixing temperature (such as 130° C. or lower). In addition, such stress cannot be released in a weak thermally fixed state, resulting in an increase in heat shrinkage.

On the contrary, according to the present disclosure, thermal fixing is carried out after the sheet is subjected to crosslinking and polymer orientation stress to the highest degree in the step before thermal fixing. Thus, it is possible to improve heat shrinkage effectively. In other words, since both silane grafting to the polyolefin back bone and crosslinking in the polyolefin are carried out before thermal fixing according to the present disclosure, the melting temperature of the separator itself is higher as compared to the separator obtained through aqueous crosslinking after thermal fixing. As a result, it is possible to increase the thermal fixing temperature (such as 130° C. or higher) according to the present disclosure. It is possible to further improve heat shrinkage.

According to an embodiment of the present disclosure, when the polyolefin is polyethylene, the thermal fixing temperature may be 120-150° C., 123-138° C., or 125-133° C. When the polyolefin is polyethylene and the thermal fixing temperature satisfies the above-defined range, polyolefin molecules may be rearranged to remove residual stress of the porous membrane, and the problem of pore blocking of the porous membrane caused by partial melting may be reduced.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

According to an embodiment of the present disclosure, after step (S4), the method may further include a step of carrying out aqueous crosslinking of the thermally fixed product at a temperature of 70-90° C. under a relative humidity of 70-90%. However, this step is optional and is for the purpose of aging.

According to an embodiment of the present disclosure, the aqueous crosslinking may be carried out a 60-100° C., 65-95° C., or 70-90° C.

According to an embodiment of the present disclosure, the aqueous crosslinking may be carried out under a humidity of 60-95% for 6-50 hours.

Meanwhile, according to an embodiment of the present disclosure, the method may further include a step of disposing an interleaving film coated with aqueous dispersion containing a crosslinking catalyst on the oriented sheet, between step (S2) and step (S3); and a step of extracting the diluting agent and removing the interleaving film, in step (S3).

According to an embodiment of the present disclosure, an interleaving film coated with aqueous dispersion containing a predetermined amount of crosslinking catalyst is disposed on the sheet oriented from step (S2), and then is wound together with the oriented sheet. Then, the diluting agent is extracted and the interleaving film is removed to accelerate crosslinking of the porous membrane.

When such an interleaving film is disposed as mentioned above, crosslinking may be carried out to a predetermined degree before extraction. In addition, it is possible to increase the degree of freedom in processing, such as the concentration of a catalyst in the extraction water bath, temperature, rate controlling, or the like.

According to an embodiment of the present disclosure, the interleaving film may include polyethylene, polypropylene, polyethylene terephthalate, polycarbonate, polybutylene terephthalate or a mixture of at least two of them.

In another aspect of the present disclosure, there is also provided a crosslinked polyolefin separator.

According to an embodiment of the present disclosure, there is provided a crosslinked polyolefin separator which has a heat shrinkage (120° C./1 hr) in the machine direction (MD) and a heat shrinkage (120° C./1 hr) in the transverse direction (TD) satisfying the following Formula 1:

$$MD+TD \leq 10\% \quad \text{[Formula 1]}$$

wherein MD represents the heat shrinkage of the crosslinked polyolefin separator in MD and TD represents the heat shrinkage of the crosslinked polyolefin separator in TD.

Herein, the heat shrinkage is calculated by the formula of:

Heat shrinkage=(Initial length−Length after carrying out heat shrinking treatment at 120° C. for 1 hour)/(Initial length)×100

The crosslinked polyolefin separator according to an embodiment of the present disclosure has a high meltdown temperature. In addition, it is possible to provide a crosslinked polyolefin separator having high heat resistance, wherein the sum of heat shrinkage in MD and heat shrinkage in TD is 10% or less.

According to an embodiment of the present disclosure, the separator may be applied to a lithium secondary battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 48 kg/hr of high-density polyethylene (Korea Petrochemical Ind. Co. Ltd., VH035) having a weight average molecular weight of 300,000 and a melting point of 135° C. as polyolefin and 112 kg/hr of liquid paraffin oil (Kukdong Oil & Chem. LP350F, 68 cSt) as a diluting agent were introduced to and mixed in an extruder. Herein, the weight ratio of polyethylene:diluting agent was 30:70. Meanwhile, 0.7 parts by weight of vinyltriethoxysilane (as an alkoxysilane containing a carbon-carbon double bonded group) based on 100 parts by weight of the total weight of the polyolefin and diluting agent, and 2 parts by weight of 2,5-dimethyl-2,5-di(tert-butylperoxy)hexane (DHBP) (as an initiator) based on 100 parts by weight of the alkoxysilane containing a carbon-carbon double bonded group were further introduced to and mixed in the extruder. Then, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. The MD orientation ratio and the TD orientation ratio were 5.5 times and 5.0 times, respectively. The orientation temperature was 105° C. in MD and 125° C. in TD.

The oriented sheet was introduced to an extraction water bath containing aqueous dispersion of dibutyltin dilaurate as a crosslinking catalyst and the diluting agent was extracted by using methylene chloride. Herein, the extraction water bath included 140 kg of methylene chloride and 100 kg of water, and the crosslinking agent was added in an amount of 2 parts by weight based on 100 parts by weight of the alkoxysilane containing a carbon-carbon double bonded group. The extraction water bath had a temperature of 70° C. In this manner, aqueous crosslinking and extraction of the diluting agent were carried out at the same time in the extraction water bath.

Then, thermal fixing was carried out at 128° C. with an orientation ratio from 1.3 times to 1.1 times to obtain a porous membrane. The porous membrane was further subjected to aqueous crosslinking at 85° C. under a relative humidity condition of 85% for 48 hours to obtain a crosslinked polyethylene separator having a thickness of 12 μm.

Example 2

A crosslinked polyolefin separator was obtained in the same manner as Example 1, except the following.

An interleaving film (PET film available from S Co., 50 μm) to which aqueous dispersion containing 5 parts by weight of dibutyltin dilaurate (crosslinking catalyst) based on 100 parts by weight of the alkoxysilane containing a carbon-carbon double bonded group was applied and dried was disposed on one surface of the oriented sheet, and then was wound together with the oriented sheet. Then, the sheet was introduced to an extraction water bath containing aqueous dispersion of 1 parts by weight of dibutyltin dilaurate as a crosslinking catalyst based on 100 parts by weight of alkoxysilane containing a carbon-carbon double bonded group, and the diluting agent was extracted by using methylene chloride. After that, the interleaving film was removed. Herein, the extraction water bath had a temperature of 50° C. Meanwhile, extraction of the diluting agent and aqueous crosslinking were carried out at the same time in the extraction water bath.

Example 3

A crosslinked polyolefin separator was obtained in the same manner as Example 1, except the following.

After the diluting agent was extracted from the oriented sheet and aqueous crosslinking of the oriented sheet was carried out at the same time, the sheet was thermally fixed at 130° C. with an orientation ratio from 1.5 to 1.2 times to obtain a porous membrane. The porous membrane was subjected to aqueous crosslinking at 85° C. under a humidity condition of 85% for 48 hours to obtain a crosslinked polyethylene separator having a thickness of 12 μm.

Comparative Example 1

First, 48 kg/hr of high-density polyethylene (Korea Petrochemical Ind. Co. Ltd., VH035) having a weight average molecular weight of 300,000 and a melting point of 135° C. as polyolefin and 112 kg/hr of liquid paraffin oil (Kukdong Oil & Chem. LP350F, 68 cSt) as a diluting agent were introduced to and mixed in an extruder. Herein, the weight ratio of polyethylene:diluting agent was 30:70. Meanwhile, 0.7 parts by weight of vinyltriethoxysilane (as an alkoxysilane containing a carbon-carbon double bonded group) based on 100 parts by weight of the total weight of the polyolefin and diluting agent, and 2 parts by weight of 2,5-dimethyl-2,5-di(tert-butylperoxy)hexane (DHBP) (as an initiator) based on 100 parts by weight of the alkoxysilane containing a carbon-carbon double bonded group were further introduced to and mixed in the extruder. Then, reactive extrusion was carried out at a temperature of 200° C. to obtain a silane-grafted polyethylene composition.

The resultant silane-grafted polyethylene composition was molded into a sheet-like shape through a T-die and cold casting roll, and then biaxial orientation was carried out by using a tenter-type sequential orienting machine performing MD orientation and then TD orientation. The MD orientation ratio and the TD orientation ratio were 5.5 times and 5.0 times, respectively. The orientation temperature was 105° C. in MD and 125° C. in TD.

The diluting agent was extracted from the oriented sheet by using methylene chloride. Herein, the extraction water bath had a temperature of 25° C. Unlike Examples, no aqueous cros slinking was carried out in the extraction water bath in Comparative Example 1.

Then, thermal fixing was carried out at 128° C. with an orientation ratio from 1.3 times to 1.1 times to obtain a porous membrane. The porous membrane was subjected to aqueous crosslinking at 85° C. under a relative humidity condition of 85% for 48 hours to obtain a crosslinked polyethylene separator having a thickness of 12 μm.

Comparative Example 2

A crosslinked polyolefin separator was obtained in the same manner as Comparative Example 1, except the following.

The diluting agent was extracted from the oriented sheet. Unlike Examples, no aqueous crosslinking was carried out in the extraction water bath in Comparative Example 2.

Then, thermal fixing was carried out at 130° C. with an orientation ratio from 1.5 times to 1.2 times to obtain a porous membrane. The porous membrane was subjected to aqueous crosslinking at 85° C. under a relative humidity condition of 85% for 48 hours to obtain a crosslinked polyethylene separator having a thickness of 12 μm.

Test Examples

Each of the separators according to Examples and Comparative Examples was evaluated. The results are shown in the following Table 1.

TABLE 1

|  | Ex. 1 | Ex. 2 | Ex. 3 | Comp. Ex. 1 | Comp. Ex. 2 |
|---|---|---|---|---|---|
| Thermal fixing temperature (° C.) | 128 | 128 | 130 | 128 | 130 |
| Thickness (μm) | 12 | 12 | 12 | 12 | 12 |
| Width shrinkage (%) after 48 hours in 85° C./85% constant-temperature constant-humidity oven | 5 | 3 | 3 | 11 | 12 |

TABLE 1-continued

|  |  | Ex. 1 | Ex. 2 | Ex. 3 | Comp. Ex. 1 | Comp. Ex. 2 |
|---|---|---|---|---|---|---|
| Air permeation time (sec/100 cc) |  | 89 | 108 | 131 | 313 | 481 |
| Heat shrinkage (120° C./60 min) | MD | 5 | 4 | 3 | 15 | 13 |
|  | TD | 4 | 3 | 2 | 9 | 5 |
| Gel content (%) after extraction |  | 18.8 | 28.4 | 21.1 | 0.4 | 1.1 |

As shown in Table 1, in the case of Examples 1-3, it can be seen that the width shrinkage (%) after 48 hours in an 85° C./85% constant-temperature constant-humidity oven is decreased by about 50% as compared to Comparative Examples 1 and 2. Particularly, Example 1 shows the lowest air permeation time.

Meanwhile, in the case of Example 2 using an interleaving film, it can be seen that the separator has both low air permeation time and low width shrinkage.

As shown in Table 1, Example 3 has lower heat shrinkage, higher air permeation time and higher gel content after extraction, as compared to Example 1. Thus, it is possible to provide a separator having a lower air permeation time by increasing thermal fixing temperature.

In Table 1, each evaluation item is determined by the following methods.

1) Method for Determining Thickness of Separator

The thickness of a separator was determined by using a thickness measuring system (VL-50S-B available from Mitutoyo Co.).

2) Method for Determining Air Permeability

Air permeability was determined by using a Gurley type air permeability tester according to JIS P-8117. Herein, the time required for 100 mL of air to pass through a diameter of 28.6 mm and an area of 645 mm² was determined.

3) Method for Determining Heat Shrinkage

Heat shrinkage was calculated by the formula of (Initial length−Length after carrying out heat shrinking treatment at 120° C. for 1 hour)/(Initial length)×100.

4) Method for Determining Gel Content

To a 20 mL vial, a weighed crosslinked separator sample (weight: W0 mg) received in a 100 mesh iron net pack was introduced and 1,2,4-trichlorobenzene was added thereto so that the crosslinked separator sample might be immersed therein sufficiently (in an amount of about 10 mL). Then, the vial was heated at a temperature of 130° C. for 2 hours or more. Then, non-dissolved crosslinked separator sample which was not filtered through the 100 mesh iron net was washed with xylene solution two times, and dried in a hot oven at 120° C. for 12 hours. The dried non-dissolved content was weighed (weight: W mg) and the gel content was calculated by using the following Formula 2.

$$\text{Gel content (\%)} = (W/W0) \times 100 \quad \text{[Formula 2]}$$

What is claimed is:

1. A method for manufacturing a crosslinked polyolefin separator, comprising the steps of:
   (S1) mixing polyolefin, a diluting agent, an initiator and alkoxysilane containing a carbon-carbon double bonded group to an extruder, and then carrying out extrusion to obtain a silane-grafted polyolefin composition;
   (S2) molding and orienting the extruded silane-grafted polyolefin composition in the form of a sheet;
   (S3) introducing the oriented sheet to an extraction water bath containing a crosslinking catalyst to extract the diluting agent and perform aqueous crosslinking; and
   (S4) thermally fixing a resultant aqueous crosslinked product.

2. The method for manufacturing the crosslinked polyolefin separator according to claim 1, wherein the extraction water bath comprises water and an extraction solvent.

3. The method for manufacturing the crosslinked polyolefin separator according to claim 2, wherein the extraction solvent is an organic solvent.

4. The method for manufacturing the crosslinked polyolefin separator according to claim 2, wherein the extraction water bath further comprises an alcohol.

5. The method for manufacturing the crosslinked polyolefin separator according to claim 4, wherein a weight ratio of water to alcohol is 95:5-80:20.

6. The method for manufacturing the crosslinked polyolefin separator according to claim 4, wherein the alcohol comprises methanol, ethanol, propanol, isopropyl alcohol, butanol, pentanol, hexanol or a mixture of at least two thereof.

7. The method for manufacturing the crosslinked polyolefin separator according to claim 1, wherein the extraction water bath has a temperature of 40° C. or higher.

8. The method for manufacturing the crosslinked polyolefin separator according to claim 1, wherein a content of the alkoxysilane containing the carbon-carbon double bonded group is 0.01-1.0 parts by weight based on 100 parts by weight of a total weight of the polyolefin and the diluting agent, and
   a content of the initiator is 0.1-5.0 parts by weight based on 100 parts by weight of the alkoxysilane containing the carbon-carbon double bonded group.

9. The method for manufacturing the crosslinked polyolefin separator according to claim 1, wherein the thermal fixing is carried out at a temperature of 120-150° C.

10. The method for manufacturing the crosslinked polyolefin separator according to claim 1, wherein the alkoxysilane containing the carbon-carbon double bonded group comprises vinyltrimethoxysilane, vinyltriethoxysilane, vinyltriacetoxysilane, (3-methacryloxypropyl)trimethoxysilane, (3-methacryloxypropyl) triethoxysilane, vinylmethyl dimethoxysilane, vinyl-tris(2-methoxyethoxy)silane, vinylmethyldiethoxysilane or a mixture of at least two thereof.

11. The method for manufacturing the crosslinked polyolefin separator according to claim 1, wherein the crosslinking catalyst comprises dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, hydrochloric acid, toluene sulfonic acid, acetic acid, stearic acid, maleic acid or a mixture of at least two thereof.

12. The method for manufacturing the crosslinked polyolefin separator according to claim 1, wherein a content of the crosslinking catalyst is 0.1-10 parts by weight based on 100 parts by weight of the alkoxysilane containing the carbon-carbon double bonded group.

13. The method for manufacturing the crosslinked polyolefin separator according to claim 1, further comprising:
   disposing an interleaving film coated with aqueous dispersion containing a crosslinking catalyst on the oriented sheet between (S2) and (S3); and
   extracting the diluting agent and removing the interleaving film in (S3).

14. The method for manufacturing the crosslinked polyolefin separator according to claim 1, further comprising:

carrying out aqueous crosslinking of the thermally fixed product at a temperature of 70-90° C. under a relative humidity of 70-90% after (S4).

15. A crosslinked polyolefin separator having a heat shrinkage (120° C./1 hr) in a machine direction (MD) and a heat shrinkage (120° C./1 hr) in a transverse direction (TD) satisfying following Formula 1:

$$MD+TD \leq 10\%, \qquad \text{[Formula 1]}$$

wherein MD represents the heat shrinkage of the crosslinked polyolefin separator in MD and TD represents the heat shrinkage of the crosslinked polyolefin separator in TD, and the heat shrinkage is calculated by formula of:

Heat shrinkage=(Initial length−Length after carrying out heat shrinking treatment at 120° C. for 1 hour)/(Initial length)×100, wherein the crosslinked polyolefin separator has a gel content after extraction from 18.8% to 28.4%.

16. The crosslinked polyolefin separator according to claim 15, wherein the crosslinked polyolefin separator is applied to a lithium secondary battery.

17. The crosslinked polyolefin separator according to claim 15, wherein the crosslinked polyolefin separator has an air permeation time determined in accordance with a JIS P-8117 testing method from 89 to 131 s/100 cc.

* * * * *